United States Patent
Kim

Patent Number: 5,811,663
Date of Patent: Sep. 22, 1998

[54] WATER LEAKAGE TESTING DEVICE FOR A THERMOSTAT OF A WATER-COOLED ENGINE

[75] Inventor: Jeongsik Kim, Kyungsangnam-do, Rep. of Korea

[73] Assignee: Hyundai Motor Corporation, Seoul, Rep. of Korea

[21] Appl. No.: 648,246

[22] Filed: May 15, 1996

[30] Foreign Application Priority Data

Jun. 30, 1995 [KR] Rep. of Korea ................... 1995 18829

[51] Int. Cl.⁶ .................................................. G01M 15/00
[52] U.S. Cl. ........................................... 73/49.7; 73/118.1
[58] Field of Search ............................... 73/116, 118.1, 73/45.5, 45.8, 49.7, 49.5, 40

[56] References Cited

U.S. PATENT DOCUMENTS

| | | |
|---|---|---|
| 4,048,845 | 9/1977 | Gilbert ..................................... 73/45.5 |
| 4,235,100 | 11/1980 | Branchini ................................ 73/49.7 |
| 4,494,402 | 1/1985 | Carney .................................... 73/49.7 |
| 4,599,890 | 7/1986 | Girone et al. ............................ 73/49.5 |
| 5,152,167 | 10/1992 | Moody ....................................... 73/40 |
| 5,193,381 | 3/1993 | Heimann .................................. 73/49.7 |
| 5,295,392 | 3/1994 | Hensel et al. ............................. 73/49.5 |
| 5,323,640 | 6/1994 | Porcaro et al. ............................. 73/40 |
| 5,349,846 | 9/1994 | Martinez et al. ........................... 73/40 |
| 5,412,978 | 5/1995 | Boone et al. ............................... 73/40 |
| 5,461,903 | 10/1995 | Harms ........................................ 73/40 |

*Primary Examiner*—George M. Dombroske
*Attorney, Agent, or Firm*—Finnegan, Henderson, Farabow, Garrett & Dunner

[57] ABSTRACT

The present invention includes a water leakage testing device for a thermostat of a water-cooled internal combustion engine including a water cooling supply portion that supplies stored cooling water through a supply line at a predertimined pressure, a hydraulic flow measuring portion that measures hydraulic flow of the cooling water supplied from the supply portion, and a supporting portion that supports and seals the lower part of the thermostat.

2 Claims, 2 Drawing Sheets

WATER LEAKAGE TESTING DEVICE FOR A THERMOSTAT OF A WATER-COOLED ENGINE

BACKGROUND

The present invention relates to a water leakage testing device of a thermostat for a water-cooled internal combustion engine.

Generally, an internal combustion engine (used to power a vehicle) generates a high degree of heat in the process of combusting fuel. This heat brings the cylinder block and cylinder head to a high temperature.

It is for this reason that internal combustion engines are equipped with cooling systems which cool engines to an appropriate level. Cooling systems are roughly divided into two groups: air-cooling and water-cooling.

The present invention is of the water-cooling-type cooling system and is related to the thermostat. Looking at the general circulation path in FIG. 1 for cooled water in a water-cooling-type cooling system, by the pumping action of the water pump, the cooling water that is stored in the radiator 100 is supplied to the water jackets 108 that are formed in the cylinder block 104 and cylinder head 106. After cooling the cylinder block and cylinder head, the water is flowed into the thermostat.

The cooling water bypasses the water pump through the action of the thermostat and it is re-circulated to the water jackets 108 if the water is below a predetermined temperature, and if the cooling water temperature is above the predetermined temperature, the cooling water is flowed into the radiator by the thermostat.

In this way, the internal combustion engine is cooled by the cooling water that circulates in the water jackets. When the cooling water gets heated, it is moved through the radiator and thus cooled, and then it is supplied to the water jackets.

In the water cooling system of a water-cooled internal combustion engine, as the cooling water temperature is controlled according to the efficiency of the thermostat, it is imperative that the thermostat operates flawlessly.

However, the above-mentioned thermostat receives constant pressure from the pumping-action of the pump. As a result, water leakage occurs in the safe receipt section, of the valve and the seat, and link section of the frame, etc. This leads to a delayed warming up of the vehicle, and when operating the vehicle after it has warmed up, overcooling can occur. These problems result in a drop in cooling performance.

It is therefore desirable, in the manufacturing process, to have an exact measure of the amount of water leakage of the thermostat in order for the operation of the thermostat to be exact. But in the prior art, it was normal practice to only measure the opening and closing of the thermostat according to temperature, not to mention the fact that there was no measurement of water leakage.

SUMMARY

Accordingly, the present invention offers a water leakage testing device with the aim of enabling the manufacture of a thermostat that does not go over a standard value of water leakage and operates flawlessly. This is accomplished by an exact measurement of water leakage according to changes in pressure.

To achieve the object and in acordance with the purpose of the invention, as embodied and broadly described herein, the present invention provides a water leakage testing device of a water thermostat for a water-cooled internal combustion engine including:

a cooling water supply portion that supplies stored cooling water through a supply line at a predertimined pressure;

a hydraulic flow measuring portion that measures the hydraulic flow of the cooling water that is supplied from the cooling water supply portion; and a measured supporting portion that supports and seals the lower part of the gauged thermostat.

DESCRIPTION

Reference will now be made in detail to the preferred embodiments of the invention, examples of which are illustrated in the accompanying drawings.

Figure 1:
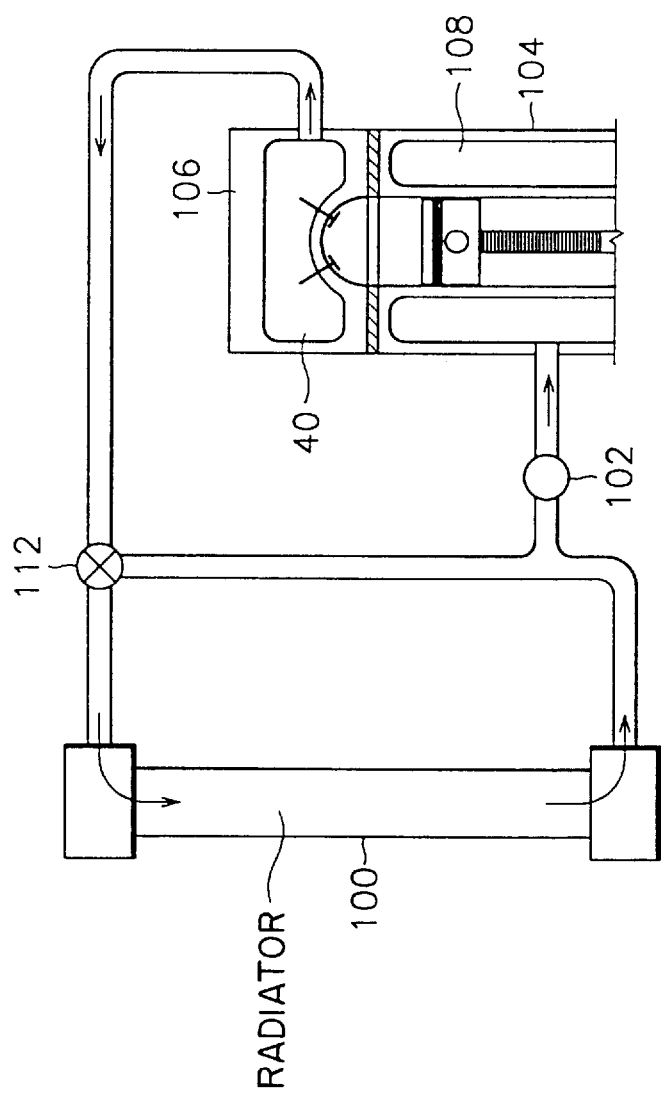
FIG. 1 is a cooling distribution diagram of a water-cooled internal combustion engine in accordance with an embodiment of the present invention.
Figure 2:
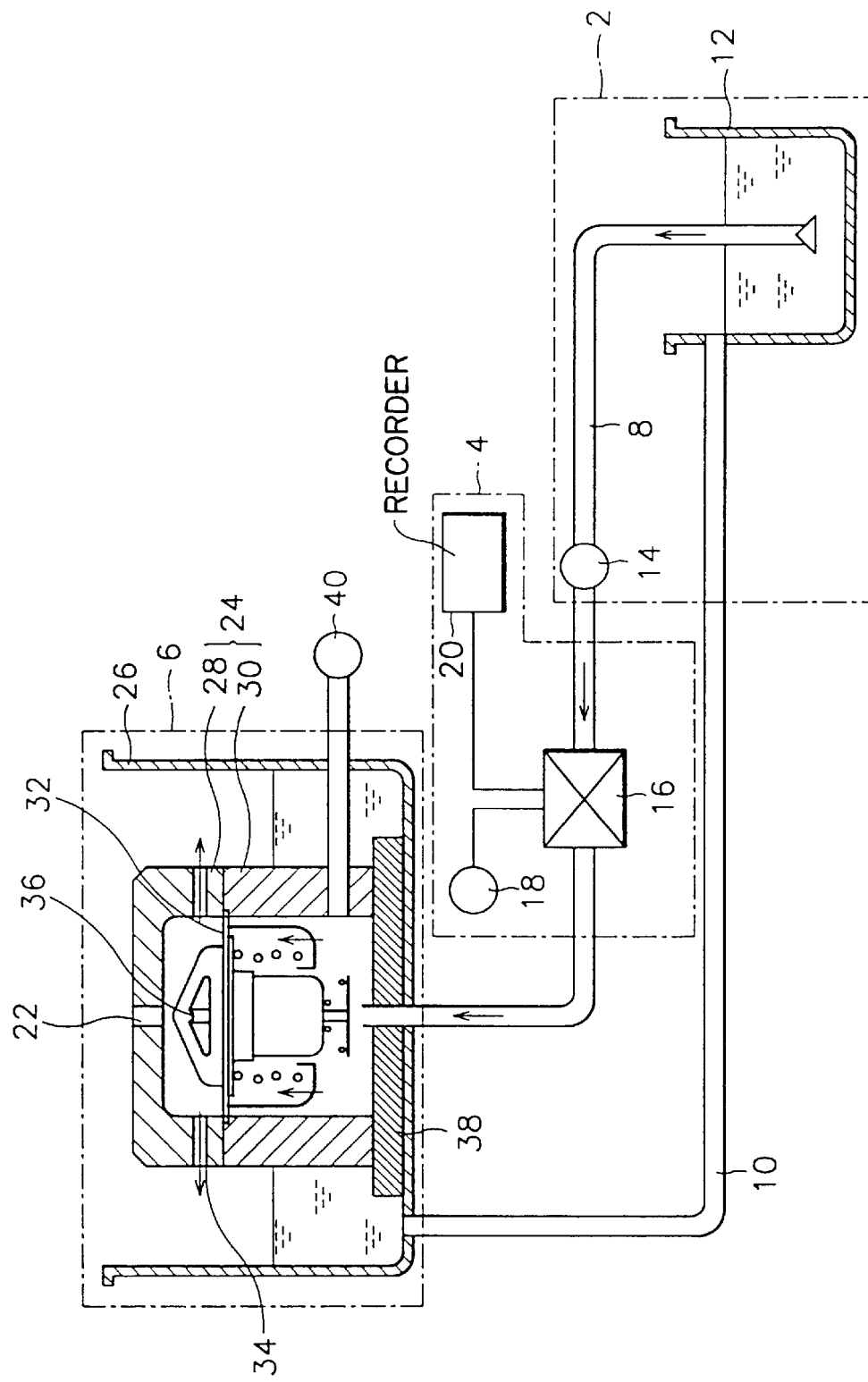
FIG. 2 is a structural diagram of a water leakage testing device in accordance with embodiment of the present invention.

FIG. 2 is a structural diagram of a water leakage testing device in accordance with the embodiment of the present invention. The inventive water leakage testing device comprises a cooling water supply portion 2, a hydraulic flow measuring portion 4, and a measured supporting portion 6.

The cooling water supply portion 2 and the measured supporting portion 6 are put in communication with each other through the supply line 8 and the return supply line 10, and the hydraulic flow measuring portion 4 is interposed on top of the supply line 8.

The cooling water supply portion 2 comprises a tank 12 that stores the cooling water, and the cooling water that is stored in the tank is pumped to the measured supporting portion 6 by a pump 14.

The pump 14 performs its pumping action in order to maintain a predetermined pressure on the supply line 8. The pumping strength of an internal combustion engine's water pump must be considered and it is, therefore, advisable to set the pumping pressure at 0.6 Kgf/cm$^2$.

The hydraulic flow measuring portion 4 comprises a measuring device 16 that measures the hydraulic flow of the cooling water that is supplied according to the pumping action of the pump 14, a flow meter 18 that is connected to the measuring device and indicates hydraulic flow to the operator of the device, and a recorder 20 that records the measured hydraulic flow.

The flow meter 18 indicates the hydraulic flow per minute. That is to say, it records in units of liters per minute(l/min).

Also, the measured supporting portion 6 comprises a measured thermostat 36; a keeper 24, that keeps the thermostat stationary; and a water tank 26, in which the keeper and thermostat are placed.

The keeper 24 is divided into upper and lower members 28 and 30, and frame 32 edges of the thermostat 36 are interposed in the boundary sections of the keeper so as to keep the thermostat stationary.

The upper member 28 comprises an exhaust hole 34 that allows leaking cooling water to flow into the water tank 26 and a hole 22 for the ventilation of air. The lower member 30 comprises a base plate 38, the cooling water supply line 8 that comes up through the base plate, and the pressure gauge 40.

The pressure gauge 40 is drawn out of the water tank 26 and placed outside. It indicates the inner pressure of the lower member 30 of the keeper 24, which is actually the pressure being applied to the thermostat 36.

The operation of the present invention is as follows:

The pump 14 starts its operation and the cooling water in the supply tank 12 is supplied, at a fixed pressure, into the space of the keeper's 24 lower member 30.

Then, if water leakage occurs in the thermostat 36 because of this pressure, the leaked cooling water flows back into the water tank 26 by way of the space in the upper member 28, and returns back to the tank 12.

At this time, because the hydraulic flow that passes through the supply line 8 is measured at the measuring device 16, the amount of water leakage is known, and the pressure gauge 40 can exactly measure the water pressure at which water leakage occurs.

Since the amount of water leakage can be exactly measured, the thermostat's performance can be known to an exact degree. And by using a thermostat that is manufactured to perform exactly in an internal combustion engine, a drop in cooling performance caused by water leakage can be prevented.

Although only a preferred embodiment and select modifications of the invention have been disclosed and described, it is apparent that other embodiments and modifications of the inventions are possible within the scope of the appended claims.

What is claimed is:

1. A water leakage testing device for a thermostat of a water-cooled internal combustion engine, comprising:

a supply line;

a cooling water supply portion for supplying stored water through the supply line at predetermined pressure;

a hydraulic flow measuring portion including
      a measuring device for measuring flow of water flowing from the cooling water supply portion,
      a flow meter for displaying the measured flow of water to an operator, and
      a recorder for recording the measured flow of water;

a supporting portion for supporting and sealing the thermostat, the supporting portion comprising
      a keeper having upper and lower portions for keeping the thermostat stationary, and
      a water tank in which the keeper is placed, the supply line supplying the water to the water tank; and a return line for returning the water from the water tank to the cooling water supply portion.

2. The water leakage testing device of claim 1, wherein said cooling water supply portion comprises a tank for storing the water and a pump for pumping water stored in the tank through the supply line.

\* \* \* \* \*